US005974957A

United States Patent [19]

Ysen

[11] Patent Number: 5,974,957

[45] Date of Patent: Nov. 2, 1999

[54] ROTATING FOOD DEHYDRATOR

[76] Inventor: David A. Ysen, 122 13th St., International Falls, Minn. 56649

[21] Appl. No.: 09/182,732

[22] Filed: Oct. 29, 1998

[51] Int. Cl.[6] .............................. A47J 27/00; A47J 37/00; A47J 37/04; A47J 43/18

[52] U.S. Cl. ............................ 99/427; 99/443 R; 99/448; 99/450; 99/476; 99/483

[58] Field of Search .............................. 99/386, 426, 427, 99/444–446, 447, 448, 450, 443 R, 443 C, 337, 421 P, 402, 483, 473–477; 126/21 A, 25 R, 26; 219/400, 388

[56] References Cited

U.S. PATENT DOCUMENTS

| | | | |
|---|---|---|---|
| 4,184,420 | 1/1980 | Podaras et al. | 99/446 X |
| 4,295,419 | 10/1981 | Langhammer | 219/400 X |
| 4,470,343 | 9/1984 | Didier | 99/427 |
| 4,491,065 | 1/1985 | Poulson | 126/21 A |
| 5,097,754 | 3/1992 | Covington et al. | 219/400 X |
| 5,158,066 | 10/1992 | Dodgen | 126/25 R |
| 5,322,007 | 6/1994 | Caridis et al. | 99/443 C |
| 5,431,093 | 7/1995 | Dodgen | 99/427 |
| 5,598,769 | 2/1997 | Luebke et al. | 99/447 X |
| 5,662,029 | 9/1997 | Ubert et al. | 99/427 |
| 5,704,278 | 1/1998 | Cross | 99/448 X |

*Primary Examiner*—Timothy Simone

[57] ABSTRACT

A food dehydrator is provided including a base with an interior space. Also included is a food supporting mechanism within the interior space of the base for supporting food thereon. A heating mechanism is adapted for generating heat within the interior space of the base. For circulating air about the food, an air circulation mechanism included. The food supporting mechanism and air circulation mechanism move with respect to each other during use.

2 Claims, 3 Drawing Sheets

ROTATING FOOD DEHYDRATOR

BACKGROUND OF THE INVENTION

1. Field of the Invention

The present invention relates to stationary food dehydrators and more particularly pertains to a new rotating food dehydrator for preparing meat jerky and other dehydrated foods.

2. Description of the Prior Art

The use of stationary food dehydrators is known in the prior art. More specifically, stationary food dehydrators heretofore devised and utilized are known to consist basically of familiar, expected and obvious structural configurations, notwithstanding the myriad of designs encompassed by the crowded prior art which have been developed for the fulfillment of countless objectives and requirements.

Known prior art stationary food dehydrators include U.S. Pat. No. 5,437,108; U.S. Pat. No. 5,423,249; U.S. Pat. No. 3,943,842; U.S. Pat. No. 5,440,825; U.S. Pat. No. 4,152,842; and U.S. Pat. Des. 252,397.

In these respects, the rotating food dehydrator according to the present invention substantially departs from the conventional concepts and designs of the prior art, and in so doing provides an apparatus primarily developed for the purpose of preparing meat jerky and other dehydrated foods.

SUMMARY OF THE INVENTION

In view of the foregoing disadvantages inherent in the known types of stationary food dehydrators now present in the prior art, the present invention provides a new rotating food dehydrator construction wherein the same can be utilized for preparing meat jerky and other dehydrated foods.

The general purpose of the present invention, which will be described subsequently in greater detail, is to provide a new rotating food dehydrator apparatus and method which has many of the advantages of the stationary food dehydrators mentioned heretofore and many novel features that result in a new rotating food dehydrator which is not anticipated, rendered obvious, suggested, or even implied by any of the prior art stationary food dehydrators, either alone or in any combination thereof.

To attain this, the present invention generally comprises a base with a rectangular configuration including a rectangular bottom face. A side wall is coupled to a periphery of the bottom face and extended upwardly therefrom for defining a rectangular upper peripheral edge and an interior space. The side wall is defined by a pair of short end faces and a pair of elongated side faces. The side wall has an arcuate inner wall defining a portion of a cylinder mounted therein between the end faces of the base. Note FIG. 5. Each of the faces of the base has an input vent and an output vent formed therein adjacent to the bottom face of the base. See again FIG. 5. Next provided is a cover including a pair of side faces each with a semicircular configuration and an arcuate top face. Such top face defines a portion of a cylinder similar to that defined by the arcuate inner wall of the base, as shown in FIG. 5. The cover further includes a lower peripheral edge being removably situated over the base. In use, the lower peripheral edge of the cover resides in engagement with the upper peripheral edge of the base for defining a compartment. With reference still to FIG. 5, a fan assembly is shown to include a bottom fan mounted to the bottom face of the base adjacent to the input vent. The bottom fan serves for directing air through the base and toward the output vent upon actuation. Associated therewith is a plurality of upright fan assemblies each including a tube connected between vents formed in the bottom face and the inner wall of the base. Each of such tubes has a lower vertical extent and an upper arcuate extent such that the associated fan directs air in a first rotational direction along the inner wall of the base upon actuation. The fan assembly further includes a plurality of circularly configured fans each mounted to the top face of the cover and the inner wall of the base within the compartment. The fan assembly is adapted for directing air in the first rotational direction upon the actuation thereof. Next provided is a heating assembly mounted over the vents formed in the inner wall of the base. The heating assembly includes a pair of arcuate side conductors with a plurality of linear laterally situated heating elements mounted therebetween for creating heat upon the actuation thereof. FIGS. 3 & 4 show a rotisserie assembly situated within the compartment and including an axle rotatably mounted between central extents of the side faces of the base adjacent to the upper peripheral edge thereof. Two sets of radially extending arms each have an inboard end coupled to a corresponding end of the axle and resides in a common plane. A pair of annular members are each coupled to outboard ends of the radially extending arms of an associated one of the sets. For supporting food thereon, a plurality of trays are each rotatably mounted between a pair of the radially extending arms. The rotisserie has a motor associated therewith for rotating the trays about the axle in a second rotational direction opposite the first rotational direction upon the actuation thereof. Situated within the compartment is a thermostat for detecting a temperature therein. As shown in FIG. 1, a control panel is mounted on one of the side faces of the base with a display for displaying a current temperature within the compartment. The display actuates the heating assembly and the motor of the rotisserie for a predetermined time period in use. When actuated, the heating assembly is governed so as to remain below a preset temperature.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rotating food dehydrator apparatus and method which has many of the advantages of the stationary food dehydrators mentioned heretofore and many novel features that result in a new rotating food dehydrator which is not anticipated, rendered obvious, suggested, or even implied by any of the prior art stationary food dehydrators, either alone or in any combination thereof.

It is another object of the present invention to provide a new rotating food dehydrator which may be easily and efficiently manufactured and marketed.

It is a further object of the present invention to provide a new rotating food dehydrator which is of a durable and reliable construction.

An even further object of the present invention is to provide a new rotating food dehydrator which is susceptible of a low cost of manufacture with regard to both materials and labor, and which accordingly is then susceptible of low prices of sale to the consuming public, thereby making such rotating food dehydrator economically available to the buying public.

Still yet another object of the present invention is to provide a new rotating food dehydrator which provides in the apparatuses and methods of the prior art some of the advantages thereof, while simultaneously overcoming some of the disadvantages normally associated therewith.

Still another object of the present invention is to provide a new rotating food dehydrator for preparing meat jerky and other dehydrated foods.

Even still another object of the present invention is to provide a new rotating food dehydrator that includes a base with an interior space. Also included is a food supporting mechanism within the interior space of the base for supporting food thereon. A heating mechanism is adapted for generating heat within the interior space of the base. For circulating air about the food, an air circulation mechanism included. The food supporting mechanism and air circulation mechanism move with respect to each other during use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
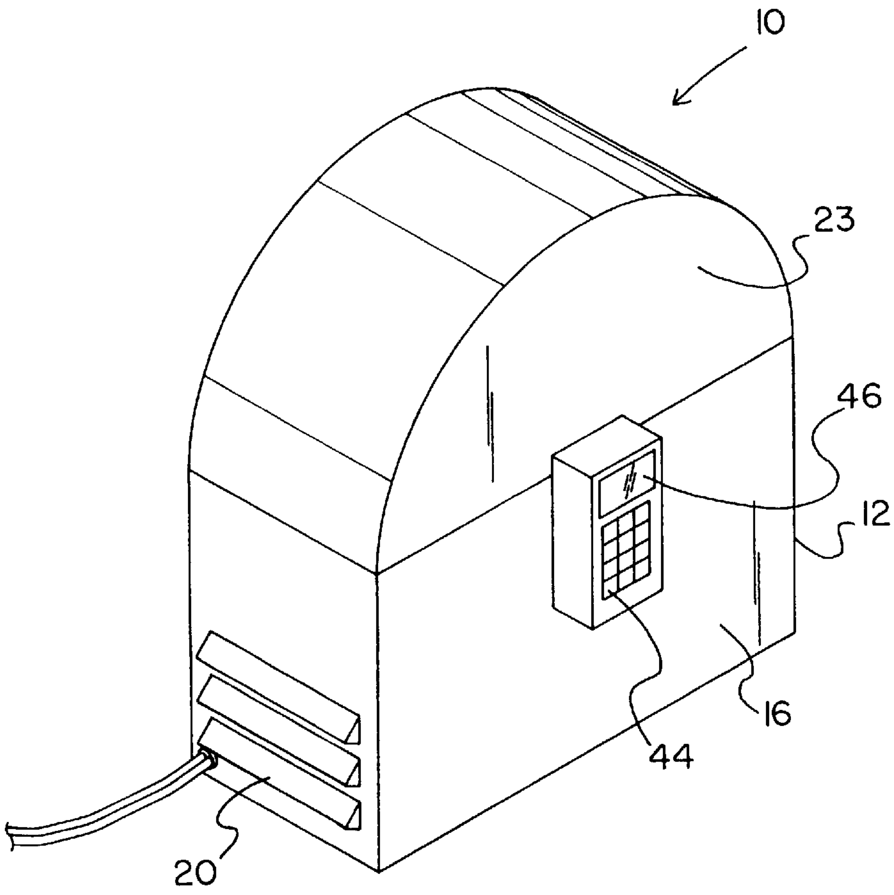
FIG. 1 is a perspective view of a new rotating food dehydrator according to the present invention.
Figure 2:
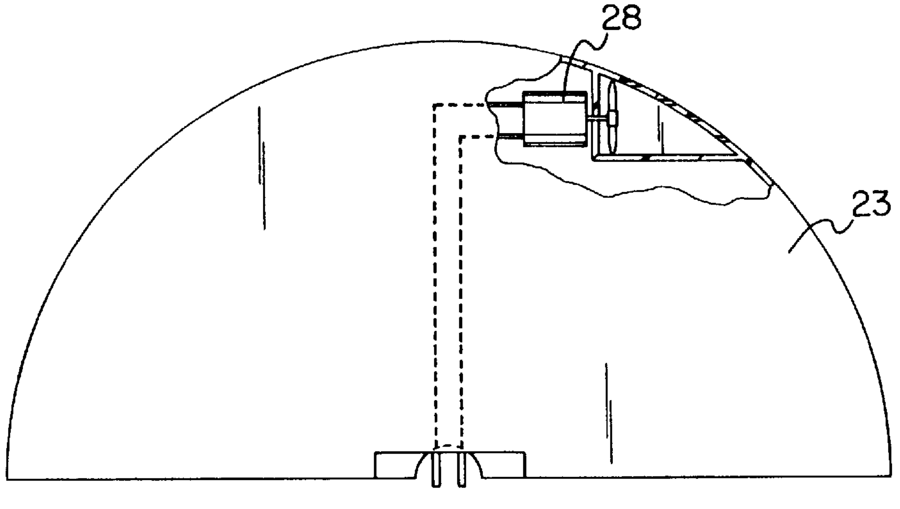
FIG. 2 is a side view of the cover of the present invention.

With reference now to the drawings, and in particular to FIGS. 1 through 6 thereof, a new rotating food dehydrator embodying the principles and concepts of the present invention and generally designated by the reference numeral 10 will be described.

The present invention, designated as numeral 10, includes a base 12 with a rectangular configuration including a rectangular bottom face 14. A side wall 16 is coupled to a periphery of the bottom face and extended upwardly therefrom for defining a rectangular upper peripheral edge and an interior space. The side wall is defined by a pair of short end faces and a pair of elongated side faces. The side wall has an arcuate inner wall 18 which defines a portion of a cylinder mounted therein between the end faces of the base. Note FIG. 5. Each of the end faces of the base has an input vent 20 and an output vent 22 formed therein adjacent to the bottom face of the base. See again FIG. 5.

Figure 5:
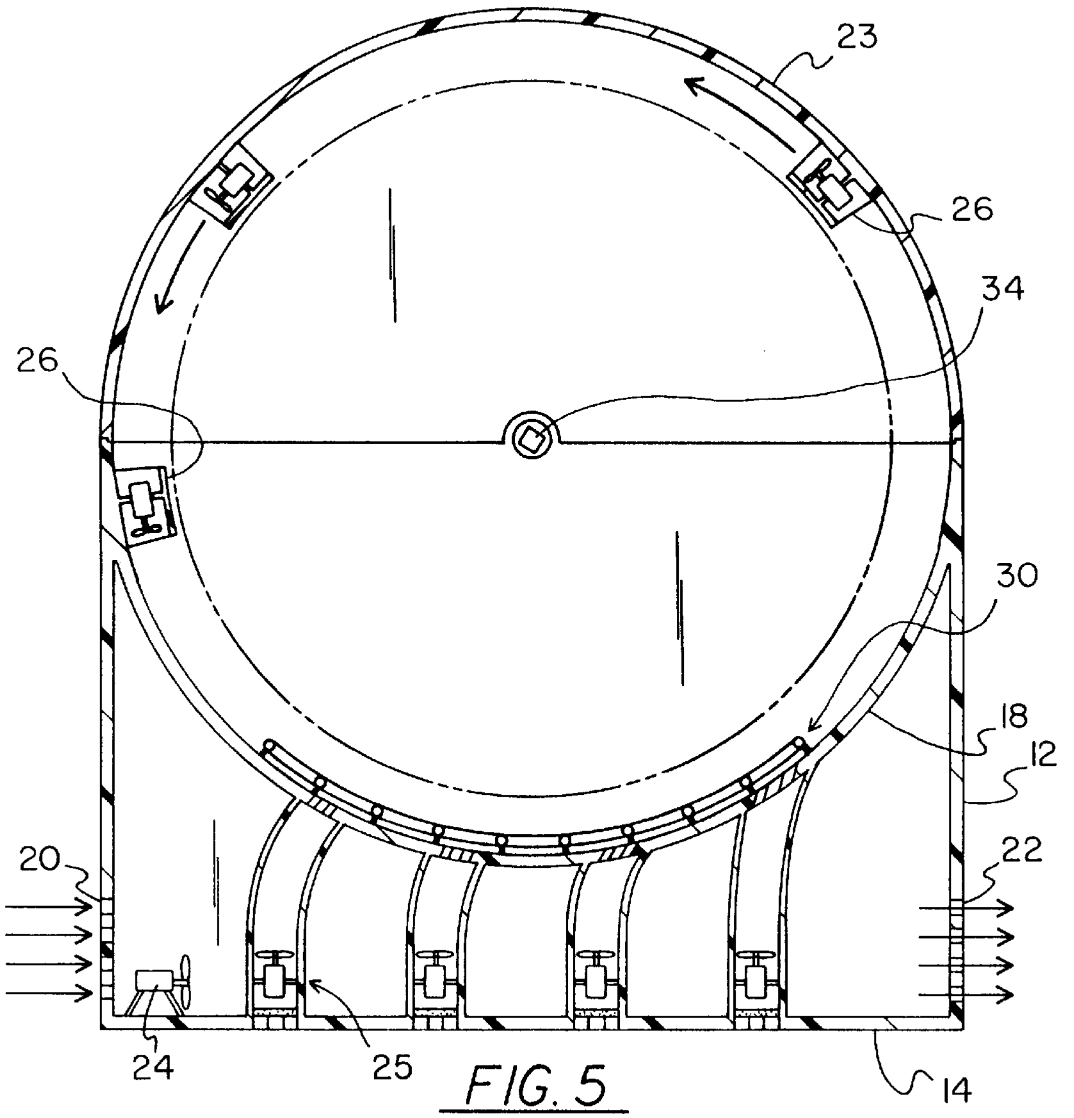
FIG. 5 is a side cross-sectional view of the present invention.
Figure 6:
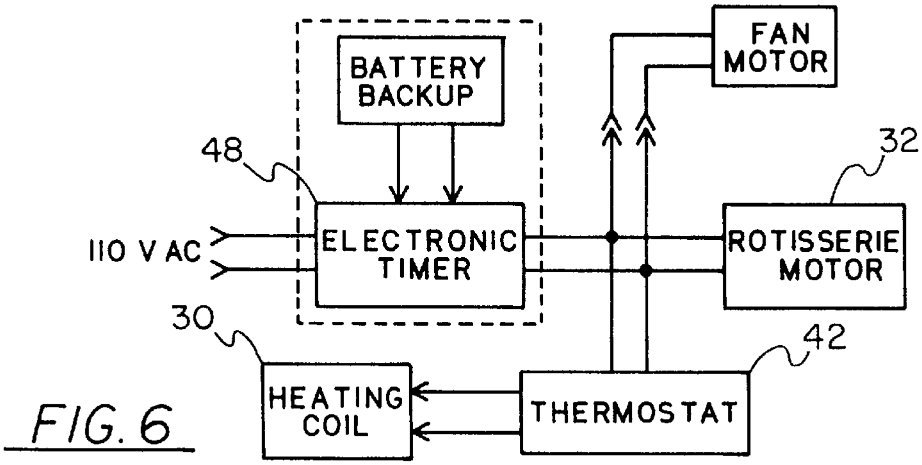
FIG. 6 is a schematic diagram of the present invention.

Next provided is a cover 23 including a pair of side faces each with a semicircular configuration and an arcuate top face. Such top face defines a portion of a cylinder similar to that defined by the arcuate inner wall of the base, as shown in FIG. 5. The cover further includes a lower peripheral edge being removably situated over the base. In use, the lower peripheral edge of the cover resides in engagement with the upper peripheral edge of the base for defining a compartment. Optionally, a locking assembly may be employed to further secure the cover to the base. It should be further noted that the base and cover may be constructed from any type of transparent, opaque plastic or the like.

With reference still to FIG. 5, a fan assembly is shown to include a bottom fan 24 mounted to the bottom face of the base adjacent to the input vent. The bottom fan serves for directing air through the base and toward the output vent upon actuation. Associated therewith is a plurality of upright fan assemblies 25 each including a tube connected between vents formed in the bottom face and the inner wall of the base. Each of such tubes has a lower vertical extent and an upper arcuate extent such that the associated fan directs air in a first rotational direction along the inner wall of the base upon actuation. Filters may be situated at a bottom of each tube, as shown in FIG. 5. As an option, the tubes may be equipped with breathing apertures for communicating air with that circulated by the bottom fan.

The fan assembly further includes a plurality of circularly configured fans 26 each mounted to the top face of the cover and the inner wall of the base within the compartment. The fan assembly is adapted for directing air in the first rotational direction upon the actuation thereof. Furthermore, the fan assembly includes a cover fan 28 mounted in a recess formed adjacent an apex of the top face of the cover. The cover fan is adapted to circulate air between an interior and exterior of the compartment. A direction of air circulation afforded by the cover fan is preferably in tangential relationship with the cover. It should be noted that the fans situated within the cover remain in communication with the base via a pair of contacts situated on the upper and lower peripheral edges of the cover and base, respectively. Note FIG. 2.

Next provided is a heating assembly 30 mounted over the vents formed in the inner wall of the base. The heating assembly includes a pair of arcuate side conductors with a plurality of linear, laterally situated heating elements mounted therebetween for creating heat upon the actuation thereof.

Figure 3:
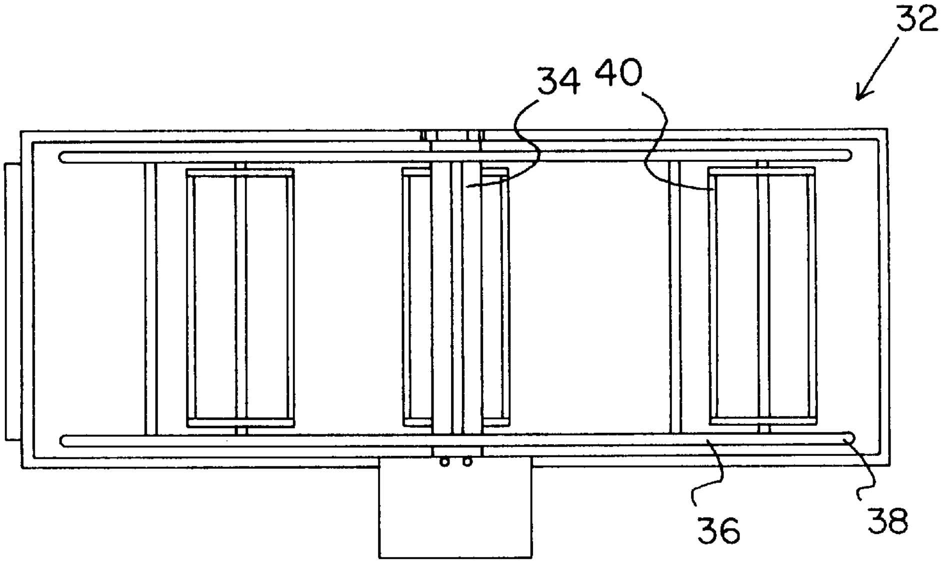
FIG. 3 is a top view of the rotisserie assembly of the present invention.
Figure 4:
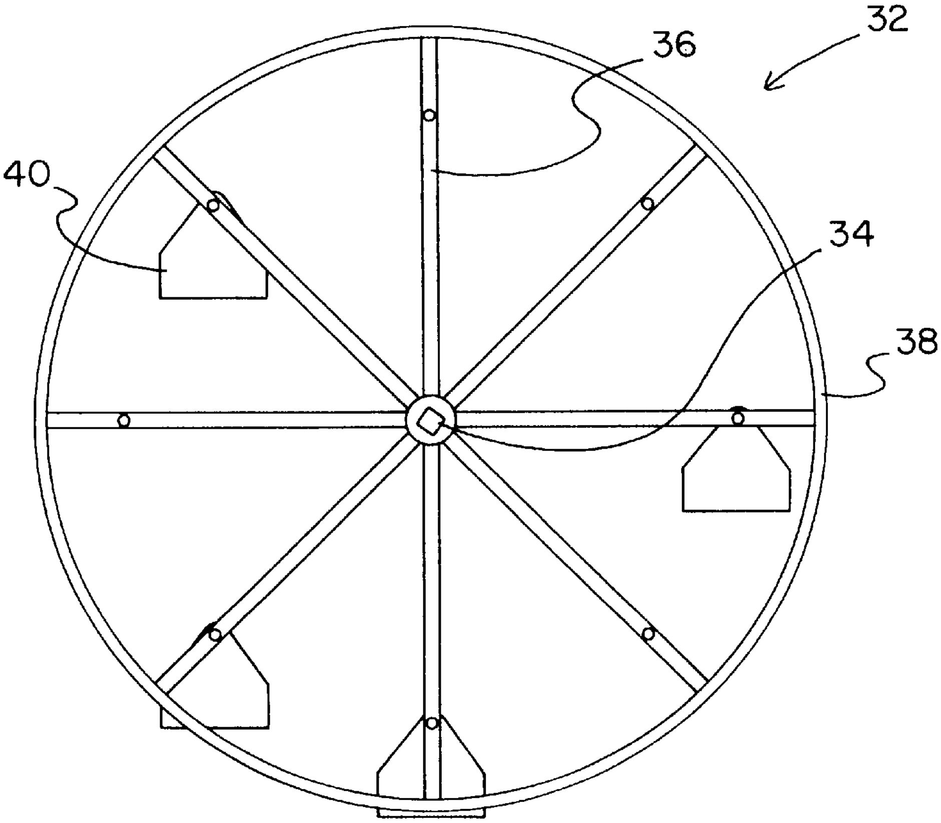
FIG. 4 is a side view of the rotisserie assembly of the present invention.

FIGS. 3 & 4 show a rotisserie assembly 32 situated within the compartment and including an axle 34 rotatably mounted between central extents of the side faces of the base adjacent to the upper peripheral edge thereof. Two sets of radially extending arms 36 each have an inboard end coupled to a corresponding end of the axle and resides in a common plane. A pair of annular members 38 are each coupled to outboard ends of the radially extending arms of an associated one of the sets, thereby defining a ferris wheel-type mechanism.

For supporting food thereon, the rotisserie assembly includes a plurality of trays 40 each rotatably mounted between a pair of the radially extending arms. The rotisserie has a motor associated therewith for rotating the trays about the axle in a second rotational direction opposite the first rotational direction upon the actuation thereof. It should be noted that the trays may take any shape or form. In the preferred embodiment, a bottom of each tray is formed of a screen. As an option, an additional undulating screen may be removably situated on the bottom of each tray for supporting additional food products. As an option, open-sided trays may be employed.

Situated within the compartment is a thermostat 42 for detecting a temperature therein. As shown in FIG. 1, a control panel 44 is mounted on one of the side faces of the base with a display 46 for displaying a current temperature within the compartment. The display actuates the heating assembly and the motor of the rotisserie for a predetermined time period by means of a timer 48. Such time period may have any selected duration and further occur at any selected time. Such selection is preferably afforded by way of a key pad or the like. Such key pad may be employed for programmable heat control. The keypad preferably includes a plurality of preset buttons each of which corresponds to unique time and temperature for dehydrating jerky, pineapple, apples, oranges, banana, etc. When actuated, the heating assembly is governed so as to remain below a preset temperature. A temperature gauge(not shown) is preferably included for visually indicating the present temperature within the unit. For powering purposes, an alternating current cord and a battery back-up is provided. As such, optional AC/DC power is provided. In an alternate embodiment, solar energy may be employed. A circuit breaker may be included for reacting to dangerous situations such as the detection of smoke and/or excessive heat levels.

It should be noted that models of various sizes may be constructed for various environments, namely large volume applications, convenient stores, and homes. Larger units may be equipped with lockable wheels for facilitating transportation. Further, lights may be situated within the compartment for monitoring the processing of the food therein. An additional option includes a rotational counter with a display for visually indicating a current amount of rotations. Yet another option includes a remote control unit for controlling the present invention in the manner set forth hereinabove.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food dehydrator comprising, in combination:

a base with a rectangular configuration including a rectangular bottom face having a side wall coupled to a periphery of the bottom face and extending upwardly therefrom for defining a rectangular upper peripheral edge and an interior space, the side wall defined by a pair of short end faces and a pair of elongated side faces, the side wall having an arcuate inner wall defining a portion of a cylinder mounted therein between the end faces of the base, wherein each of the faces have an input vent and an output vent formed therein adjacent to the bottom face of the base;

a cover including a pair of side faces each with a semicircular configuration and an arcuate top face defining a portion of a cylinder similar to that defined by the arcuate inner wall of the base, the cover further including a lower peripheral edge being removably situated over the base in engagement with the upper peripheral edge of the base for defining a compartment;

a fan assembly including a bottom fan mounted to the bottom face of the base adjacent to the input vent for directing air through the base and toward the output vent upon actuation and a plurality of upright fan assemblies each including a tube connected between vents formed in the bottom face and the inner wall of the base, each tube having a lower vertical extent and an upper arcuate extent such that the associated fan directs air in a first rotational direction along the inner wall of the base upon actuation, the fan assembly further including a plurality of circularly configured fans each mounted to the top face of the cover and the inner wall of the base within the compartment for directing air in the first rotational direction upon the actuation thereof;

heating means mounted over the vents formed in the inner wall of the base, the heating assembly including a pair of arcuate side conductors with a plurality of linear laterally situated heating elements mounted therebetween for creating heat upon the actuation thereof;

a rotisserie assembly situated within the compartment and including an axle rotatably mounted between central extents of the side faces of the base adjacent to the upper peripheral edge thereof, two sets of radially extending arms each having an inboard end coupled to a corresponding end of the axle and residing in a common plane, a pair of annular members each coupled to outboard ends of the radially extending arms of an associated one of the sets, and a plurality of trays each rotatably mounted between a pair of the radially extending arms, wherein the rotisserie has a motor for rotating the trays about the axle in a second rotational direction opposite the first rotational direction upon the actuation thereof;

a thermostat situated within the compartment for detecting a temperature therein; and a control panel mounted on one of the side faces of the base with a display for displaying a current temperature within the compartment and actuating the heating means and the motor of the rotisserie for a predetermined time period, wherein the heating means is governed so as to remain below a preset temperature.

2. A food dehydrator comprising:

a base including a bottom face having a side wall coupled to a periphery of the bottom face and extending upwardly therefrom for defining an upper peripheral edge and an interior space;

the side wall being defined by a pair of short end faces and a pair of elongated side faces;

the side wall having an arcuate inner wall defining a portion of a cylinder mounted therein between the end faces of the base;

wherein each of the faces have an input vent and an output vent formed therein adjacent to the bottom face of the base;

a cover including a pair of side faces each with a semicircular configuration and an arcuate top face defining a portion of a cylinder similar to that defined by the arcuate inner wall of the base;

the cover further including a lower peripheral edge being removably situated over the base in engagement with the upper peripheral edge of the base for defining a compartment;

a fan assembly including a bottom fan mounted to the bottom face of the base adjacent to the input vent for directing air through the base and toward the output vent upon actuation and a plurality of upright fan assemblies each including a tube connected between vents formed in the bottom face and the inner wall of the base;

each tube having a lower vertical extent and an upper arcuate extent;

the fan assembly further including a plurality of fans each mounted to the top face of the cover and the inner wall of the base in the compartment;

heating assembly mounted over the vents formed in the inner wall of the base, the heating assembly including a pair of arcuate side conductors with a plurality of linear laterally situated heating elements mounted therebetween;

a rotisserie assembly situated in the compartment and including an axle rotatably mounted between central extents of the side faces of the base adjacent to the upper peripheral edge thereof, two sets of radially extending arms each having an inboard end coupled to a corresponding end of the axle and residing in a common plane, a pair of annular members each coupled to outboard ends of the radially extending arms of an associated one of the sets, and a plurality of trays each rotatably mounted between a pair of the radially extending arms;

wherein the rotisserie has a motor for rotating the trays about the axle;

a thermostat situated in the compartment for detecting a temperature therein; and a control panel mounted on one of the side faces of the base with a display for displaying a current temperature in the compartment and actuating the heating assembly and the motor of the rotisserie for a predetermined time period, wherein the heating assembly is governed so as to remain below a preset temperature.

* * * * *